(12) United States Patent
Pearce

(10) Patent No.: US 10,524,129 B2
(45) Date of Patent: Dec. 31, 2019

(54) SYSTEM AND METHOD OF MODIFYING POLICY SETTINGS IN AN ELECTRONIC DEVICE

(71) Applicant: BLACKBERRY LIMITED, Waterloo (CA)

(72) Inventor: Graham Pearce, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 57 days.

(21) Appl. No.: 15/439,345

(22) Filed: Feb. 22, 2017

(65) Prior Publication Data

US 2017/0164202 A1 Jun. 8, 2017

Related U.S. Application Data

(63) Continuation of application No. 12/943,288, filed on Nov. 10, 2010, now Pat. No. 9,596,601, which is a
(Continued)

(51) Int. Cl.
*H04W 4/00* (2018.01)
*H04W 12/08* (2009.01)
(Continued)

(52) U.S. Cl.
CPC .......... *H04W 12/08* (2013.01); *H04L 63/102* (2013.01); *H04W 4/029* (2018.02); *H04W 8/205* (2013.01); *H04W 48/04* (2013.01)

(58) Field of Classification Search
CPC ...... H04W 12/06; H04W 84/12; H04W 84/18
(Continued)

(56) References Cited

U.S. PATENT DOCUMENTS 7,096,030 B2* 8/2006 Huomo ................. H04W 4/02
455/412.1
2003/0093518 A1 5/2003 Hiraga
(Continued)

OTHER PUBLICATIONS

Pearce, Graham, "System and Method of Modifying Policy Settings in an Electronic Device", U.S. Appl. No. 11/055,489, filed Feb. 11, 2015. Abandoned.
(Continued)

*Primary Examiner* — Omoniyi Obayanju
(74) *Attorney, Agent, or Firm* — Perry + Currier Inc.

(57) ABSTRACT

The present invention provides a system and method of modifying policy settings in an electronic device. An embodiment includes a plurality of access stations, each capable of wirelessly transmitting across a geographic region. A mobile electronic device, capable of roaming between regions is operable to establish a wireless link with the access stations. The device is owned by an office which sets communication policies determining through which access stations mobile device can place voice calls. This policy is stored on an office server as a database and periodically transmitted to the device as the device makes contact with the office server over the internet. Hence, the device maintains a copy of this policy database. When placing a voice call, the device first determines which access station is serving the region it is located in and then determines whether it is allowed to place a call through that access station using its policy database.

20 Claims, 8 Drawing Sheets

Related U.S. Application Data continuation of application No. 11/055,489, filed on Feb. 11, 2005, now abandoned.

(51) Int. Cl.
    *H04W 4/029*     (2018.01)
    *H04L 29/06*     (2006.01)
    *H04W 8/20*     (2009.01)
    *H04W 48/04*     (2009.01)

(58) Field of Classification Search
    USPC .................................................. 455/411, 410
    See application file for complete search history.

(56) References Cited

U.S. PATENT DOCUMENTS

| | | |
|---|---|---|
| 2003/0134626 A1 | 7/2003 | Himmel et al. |
| 2005/0254474 A1* | 11/2005 | Iyer .................... H04L 63/1416 370/338 |
| 2005/0260973 A1* | 11/2005 | van de Groenendaal ................... H04L 63/102 455/411 |

OTHER PUBLICATIONS

Pearce, Graham, "System and Method of Modifying Policy Settings in an Electronic Device", U.S. Appl. No. 12/943,288, filed Nov. 10, 2010. Allowed.

United States Patent and Trademark Office, Office Action, dated Nov. 15, 2019, in relation to U.S. Appl. No. 16/598,018.

* cited by examiner

SYSTEM AND METHOD OF MODIFYING POLICY SETTINGS IN AN ELECTRONIC DEVICE

CROSS-REFERENCE TO RELATED APPLICATIONS

This is a continuation of U.S. patent application Ser. No. 12/943,288, filed Nov. 10, 2010, which is a continuation of U.S. patent application Ser. No. 11/055,489 filed Feb. 11, 2005 (now abandoned), the contents of which are incorporated herein by reference.

FIELD OF THE INVENTION

The present invention relates generally to wireless telecommunication and more particularly to a system and method for modifying policy settings in an electronic device.

BACKGROUND OF THE INVENTION

Mobile electronic devices (MEDs) capable of computing, information storage and communications are increasingly becoming commonplace. MEDs typically integrate the functions of personal information management such as calendaring, data communications such as e-mail and world wide web browsing and telecommunications into a single device. Research In Motion Limited of Waterloo, Ontario, Canada, and PalmOne, Inc. of Milpitas, Calif. USA are two examples of manufacturers of such enhanced wireless electronic devices, and each offer a variety of products in this category.

A typical MED contains a communications interface for establishing wireless communications with telephony and data networks serving different geographic regions. In addition a typical MED contains a microcomputer which controls most of the functionality of the MED and aids in processing of information that the MED is presented with.

As part of its functionality, a MED is called upon to establish communications with a network through many different network access stations as the user of the MED roams through different geographic regions served by different network access station wireless carrier. Typically, each MED has a designated "home" region served by a "home" wireless carrier. All other regions are roaming regions. The characteristics of services provided when a MED accesses a network through its home region, as opposed to through a roaming region. Such service differences can include reduced connection security, reduced availability of certain types of communications such as bandwidth for data communications, and increased connection fees known as roaming charges. Moreover, the differences in service depend on the roaming region through which a connection is made. For example, availability of digital connections can vary from region to region.

Variability of service between the home region and the roaming regions can present a significant problem to MED users or employers who pay for the services on behalf of such users. Typically, a user who wants to establish secure connections or avoid roaming charges, for example, monitors his or her location and uses wireless communication only in the roaming regions where secure connections are offered or where no roaming charges are incurred. This requires a knowledge of the geographic region covered and services offered by the each network. Moreover, employers paying for user's services, unlike users, have no way of monitoring individual MED locations and hence rely on individual user's vigilance in order to ensure secure connections or avoid roaming charges.

SUMMARY OF THE INVENTION

It is an object of the present invention to provide a novel system and method for secure access that obviates or mitigates at least one of the above-identified disadvantages of the prior art.

An aspect of the invention provides a subscriber device comprising an interface operable to conduct communications over a link with at least one base station in each of a plurality of geographic regions. The device also includes a microcomputer connected to the interface that is operable to maintain a policy associated with each region. The policy defines whether communications between the interface and the at least one base station are permitted for each region. The microcomputer permits the interface to communicate in accordance with the policy.

The communications can include a plurality of different services. The services can include at least one of voice, emails, internet browsing and text messaging.

The policy can permit one type of service to be performed in one specific region, while disallowing another type of service in the same specific region.

The policy can disallow communications in a particular region if the communications within the region are conducted over an insecure link, or are otherwise insecure.

The policy can disallow communications in a particular region if the communications within the region are conducted over an insecure link, or are otherwise insecure.

The policy can disallow the communications in at least one of the regions if a financial cost for conducting the communications exceeds a predefined threshold.

The links can include wireless links that can be based on one or more of CDMA, OFDM, AMPS, GSM, GPRS, Bluetooth™, infra-red and 802.11.

The links can include wired links that can be based on Ethernet; USB; Firewire and RS-232.

Another aspect of the invention provides a method of conducting communications from a subscriber device comprising the steps of:
i) establishing a link with a base station from the subscriber device;
ii) receiving an identifier from the base station at the subscriber device;
iii) determining whether communications with the base station are permitted based on the identifier; and,
iv) conducting the communications from the subscriber device only if the communications are permitted according to said determining step.

Another aspect of the invention provides a server for communicating with a plurality of subscriber devices comprising a microcomputer operable to maintain a policy defining whether communications between at least one subscriber station and at least one base station are permitted. The server also an interface for delivering the policy to each of the at least one subscriber device.

Another aspect of the invention provides a computer readable media operable to store a set of programming instructions. The programming instructions are for operating a server that is for communicating with a plurality of subscriber devices. The programming instructions are executable on a microcomputer associated with the server. The programming instructions are for rendering the microprocessor operable to maintain a policy defining whether communications between at least one subscriber station and at least one base station is permitted.

Another aspect of the invention provides a computer readable media operable to store a policy for storage in a subscriber station. The policy defines whether communications between the subscriber station and a particular base station are permitted.

BRIEF DESCRIPTION OF THE DRAWINGS

The invention will now be described by way of example only, and with reference to the accompanying drawings, in which.

DETAILED DESCRIPTION OF THE INVENTION

Figure 1:
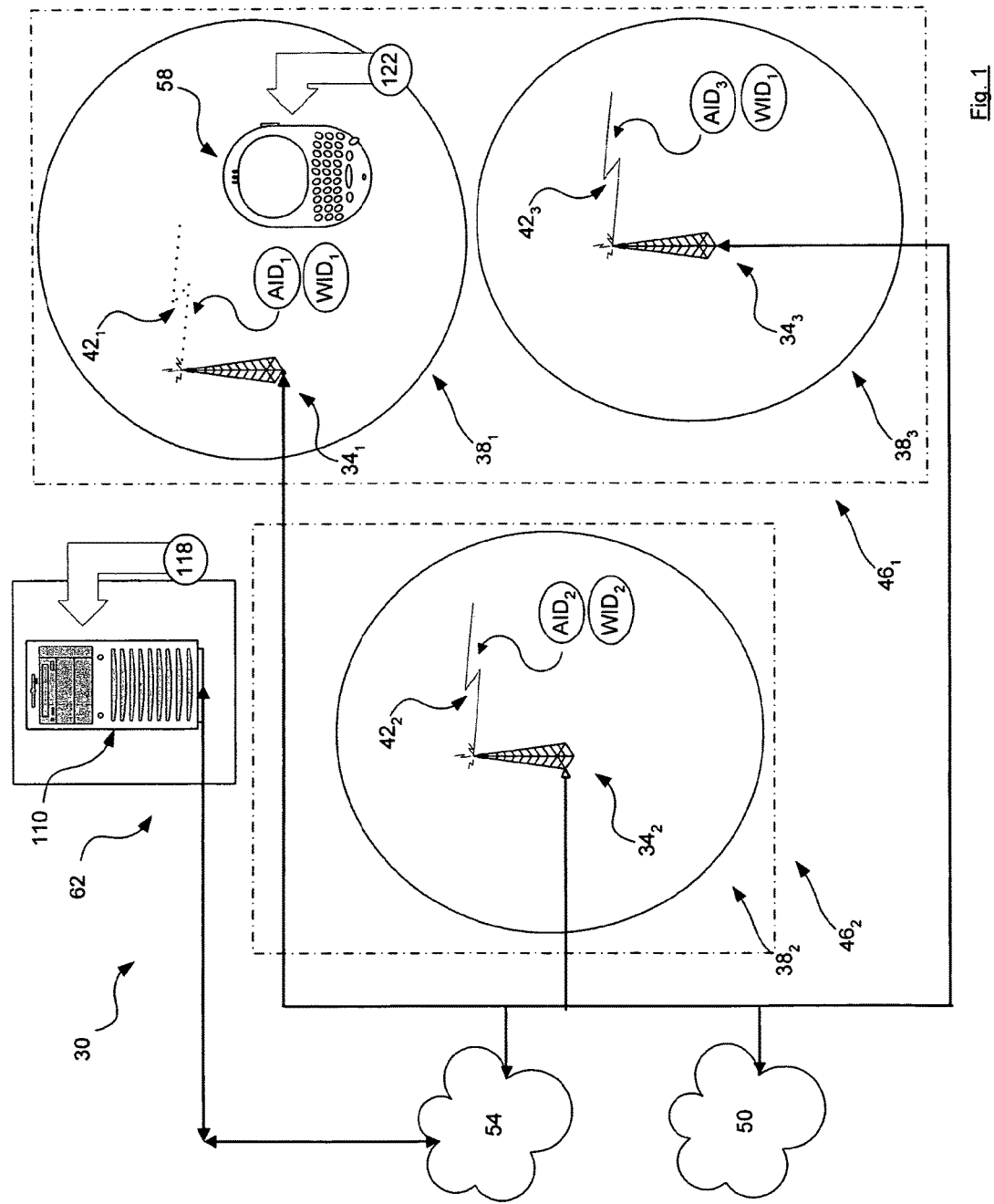
FIG. 1 is a block diagram of a system for modifying communication policy in accordance with an embodiment of the invention.

Referring now to FIG. 1, a wireless communication system in accordance with a first embodiment of the invention is indicated generally at 30. System 30 comprises a plurality of access stations 34 operable to wirelessly transceive across a variety of geographic ranges 38. In a present embodiment, station $34_1$ transceives across a first geographic range $38_1$, station $34_2$ transceives across range $38_2$ and station $34_3$ transceives across geographic range $38_3$. Access stations 34 communicate wirelessly over a plurality of links 42. More specifically, station $34_1$ covers first geographic range $38_1$ by transmitting and receiving signals through link $42_1$, station $34_2$ covers second geographic range $38_2$ through link $42_2$ and base station $34_3$ covers third geographic range $38_3$ through link $42_3$. Access stations 34 are operated by different wireless carriers 46. For example, stations $34_1$ and $34_3$ are operated by wireless carrier $46_1$, whereas station $34_2$ is operated by wireless carrier $46_2$. In a present embodiment, system 30 is based on a known voice-based wireless telecommunication such as Global System for Mobile Communications ("GSM") or Advanced Mobile Phone System ("AMPS").

In system 30, access stations 34 are also connected to a network 50 and network 54 through a wired connection. In this embodiment network 50 is the public switched telephone network ("PSTN") and network 54 is the Internet, but in other embodiments other types of networks can be employed.

System 30 also includes a mobile electronic device 58. Device 58 is owned by office 62 and operated by persons associated with office 62. As will be described in greater detail below, device 58 is operable to connect to network 50 via a station 34's link 42 each time device 58 is located within a range respective to that access station 34. For example, whenever device 58 is located within geographic range $38_1$, device 58 can connect to network 50 by linking with access station $34_1$ through link $42_1$, and whenever device 58 is located within geographic range $38_2$, device 58 can connect to network 50 by linking with station $34_2$ through link $42_2$.

Various types of information can be communicated through a link 42, including voice communications, data communications, etc. In particular, links 42 each carry a wireless carrier identifier WID, that identifies the wireless carrier 46 operating the respective access station 34 that carries that particular link 42. For example, if device 58 is located within geographic range $38_1$, or range $38_3$ device 58 would receive identifier $WID_1$ through link $42_1$. In addition, links 42 each carry an access station identifier AID, that identifies the access station 34 that carries that particular link 42. For example, if device 58 is located within geographic range $38_1$, device 58 would receive identifier $AID_1$ through link $42_1$. Furthermore, links 42 carry the phone number (or other unique identifier) associated with each device 58 that connects with an access station 34. For example, if device 58 is located within geographic range $38_1$, station $34_1$ would receive the phone number of device 58 through link $42_1$. Moreover, links 42 can be based on any number of different wireless communication formats such as analog or digital depending on the type of wireless communication method used. For example, when station 34 employs GSM for wireless communication, link 42 established by that station is a digital link. When station 34 employs AMPS for wireless communication, link 42 established by that station is an analog link. Unlike analog links, which send signals using a continuous stream, digital links transmit the communications in packetized bit streams. Digital links 42 based on GSM offer enhanced security over analog links 42 based on AMPS. Interception and reconstruction of a digital link involves more highly specialized and expensive equipment than an analog link. Moreover, digital links 42 can be encrypted using methods such as stream ciphers, resulting in an encrypted communication between device 50 and access station 34. In this embodiment link $42_1$ is a digital link, whereas links $42_2$ and $42_3$ are analog links. As such, link $42_1$ is inherently more secure then links $42_2$, and $42_3$.

Figure 2:
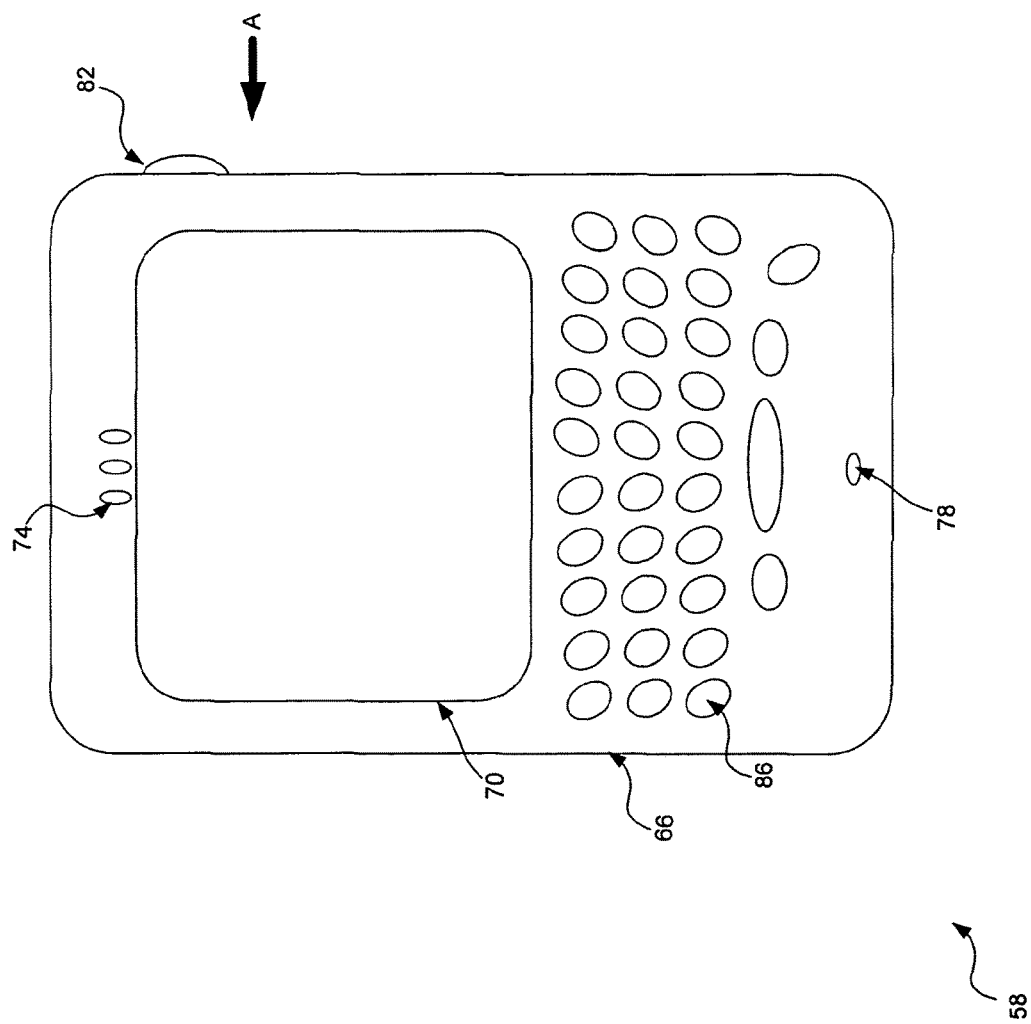
FIG. 2 is a block diagram of the mobile electronic device of FIG. 1.

Referring now to FIG. 2, device 58 is shown in greater detail. Device 58 is based on the computing environment and functionality of a personal digital assistant with wireless voice telephony capabilities. However, it is to be understood that device 58 can be based on the construction and functionality of any mobile electronic device that can be connected to a wireless network as well. Such devices include cellular telephones or laptops computers connected to wireless networks. In a present embodiment, electronic device 58 includes, a housing 66, which frames an LCD display 70, a speaker 74, a microphone 78, a trackwheel 82, and a keyboard 86. Trackwheel 82 can be inwardly depressed along the path of arrow "A" as a means to provide additional user-input. It will be understood that housing 66, can be made from any suitable material as will occur to those of skill in the art.

Figure 3:
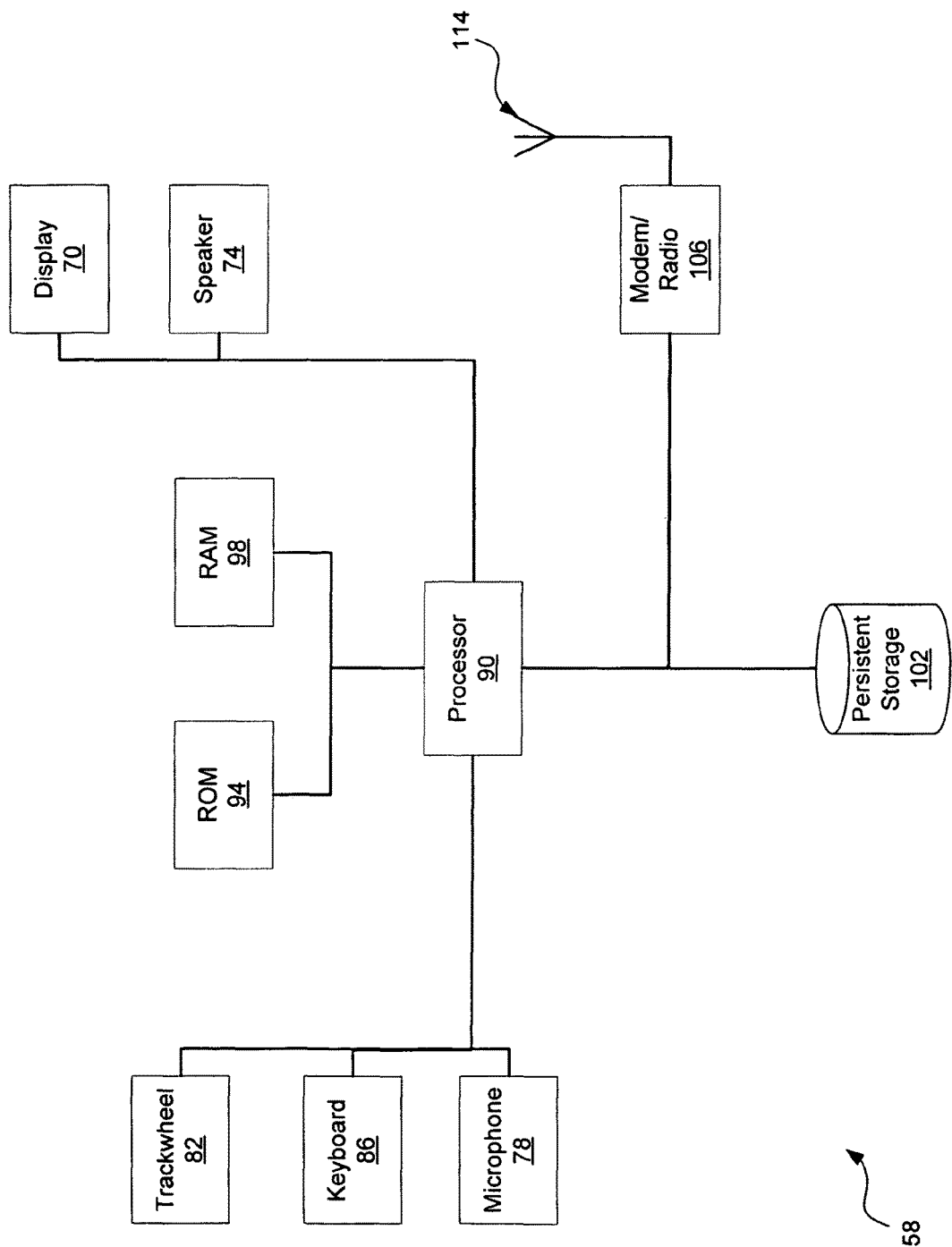
FIG. 3 is a block diagram of certain internal components of a mobile electronic device of FIG. 1.

Referring now to FIG. 3, a block diagram of certain internal components within device 58 is shown. Device 58 is based on a microcomputer that includes a processor 90. Processor 90 is connected to a read-only-memory ("ROM") 94, which contains a plurality of applications executable by processor 90 that enables device 58 to perform certain functions. Processor 90 is also connected to a random access memory unit ("RAM") 98 and a persistent storage device 102 which is responsible for various non-volatile storage functions of device 58. Processor 90 can send output signals to various output devices including display 70 and speaker 74. Processor 90, can also receive input from various input devices including microphone 78 and keyboard 86. Processor 90 is also connected to a modem and radio 106. Modem and radio 106 are operable to connect device 58 to wireless access stations 34 in range of device 58, in the usual manner, via an antenna 114.

Referring back to FIG. 1, office server 110 is a computing device, (such as a personal computer, a server, or the like) that is typically comprised of hardware suitable for server type functions, and includes a central processing unit, random access memory, hard-disk storage and a network interface for communicating over network 54. Office server 110 stores the office connection policy ("CP") database 118, used for determining which access stations 34 a device 58 can link with in order to connect to a network. Table I shows the initial settings of an example CP database 118 of office 62 for device 58 when it attempts to connect to network 50, namely when a wireless voice call is being made.

TABLE I

Example record of a CP Database 118 of Office 62 Record # 1

| Field 1<br>Device<br>Identifier | Field 2<br>Access<br>Station<br>Identifier | Field 3<br>Policy for<br>Voice Calls |
|---|---|---|
| 555-555-5555 | $AID_1$ | Allow Communication |
|  | $AID_2$ | Allow Communication |
|  | $AID_3$ | Allow Communication |

Table I shows one record, labelled Record 1, which reflects information corresponding to device 58. It should now be apparent that database 118 can include additional records for any additional devices 58 that are included in system 30.

Describing Table I in greater detail, Field 1 contains the unique identifier of device 58, in this case its phone number "555-555-5555". Field 2 contains a list of unique identifiers, AID, associated with access stations 34. Field 3 contains the communications policy of office 62 for each access station 34, in this case simply the decision to either "Allow Communication", or "Disallow Communication". In this case a communication is allowed through access stations $AID_1$, $AID_2$ and $AID_3$. (It should now be apparent that other communications policies (rather than "allow" or "disallow" communication) can be stored in CP databases 118, and 122. For example, the communication policy stored may be to limit the length of the call when device 58 is in range of some access stations and allow limitless calls when in range of others. It should also be apparent that a combination of policies can also be used.)

By the same token, device 58 also includes CP database 122 that includes data corresponding to the information stored in CP database 118. The initial settings of CP database 122 are shown in Table II.

TABLE II

Example of a CP Database 122 of Device 58

| Field 1<br>Access<br>Station<br>Identifier | Field 2<br>Policy for<br>Voice Calls |
|---|---|
| $AID_1$ | Allow Communication |
| $AID_2$ | Allow Communication |
| $AID_3$ | Allow Communication |

Field 1 of database 122 corresponds to Field 2 of database 118, and Field 2 of database 122 corresponds to Field 3 of database 118. Because initially, when the user first acquires the device from office 62, device database 122 has the same content as the office database 118.

The policy, as described by CP database 118, is set by office 62 and updated by office 62 from time to time as needed. For example, office 62 may desire that device 58 should place wireless calls through network 50 only when a digital link is available between an access station 34 and device 50 to reduce the chances that the wireless portion of the call is intercepted. According to this policy office 62 would not want device 58 to connect to network 50 through access stations $34_2$ or $34_3$ since stations $34_2$ $34_3$ only provide an analog link $42_2$ $42_3$ based on AMPS which is highly susceptible to interception. Thus, policy database 118 would be updated to reflect the new policy as shown in Table III.

TABLE III

Example record of an Updated CP Database 118 of Office 62 Record # 1

| Field 1<br>Device<br>Identifier | Field 2<br>Access<br>Station<br>Identifier | Field 3<br>Policy for<br>Voice Calls |
|---|---|---|
| 555-555-5555 | $AID_1$ | Allow Communication |
|  | $AID_2$ | Disallow Communication |
|  | $AID_3$ | Disallow Communication |

Notice that Field 3 associated with $AID_2$ has been changed to "Disallow Communication" to reflect the new policy that device 58 should not connect to network 50 through access station $34_2$.

At this point device database 122 no longer contains the same policies as office database 118. Office 110 is operable to update CP database 122 of device 58 by communicating with device 58 when device 58 connects to network 54.

Figure 4:
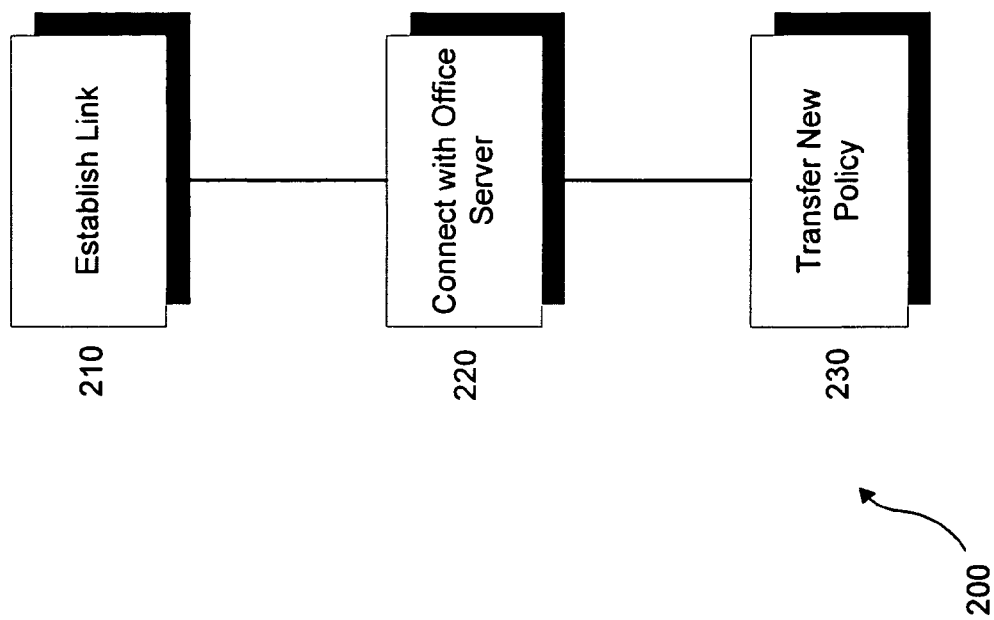
FIG. 4 is a flowchart depicting a method of updating information in accordance with an embodiment of the invention.

Referring to FIG. 4, a method for updating policy database 122 is indicated generally at 200. In order to assist in the explanation of the method, it will be assumed that method 200 is operated using system 30, and that device 58, as shown in FIG. 1, is located in range $38_1$. Furthermore, the following discussion of method 200 will lead to further understanding of system 30 and its various components. (However, it is to be understood that system 30 and/or method 200 can be varied, and need not work exactly as discussed herein in conjunction with each other, and that such variations are within the scope of the present invention).

Referring back to FIG. 4, at step 210 a link is established. As an example of how step 210 can be performed, device 58 establishes link 42$_1$ with station 34$_1$ which is serving the range 38$_1$. Moving to step 220, a connection is made with an office server. Continuing with the example, when step 220 is performed device 58 will use link 42$_1$ established at step 210 to connect to network 54, and through network 54, will eventually make a connection to office server 110.

Method 200 will then advance from step 220 to step 230, at which point the new policy is transferred. Continuing with the example, database 122 is updated by transferring the new policy to device 58. The updated CP database 122 is shown in Table IV.

TABLE IV

Example of an Updated CP Database 122 of Device 58

| Field 1<br>Access<br>Station<br>Identifier | Field 2<br>Policy for<br>Voice Calls |
|---|---|
| AID$_1$ | Allow Communication |
| AID$_2$ | Disallow Communication |
| AID$_3$ | Disallow Communication |

To summarize the example, database 122 originally held the contents of Table II, but upon performance of method 200 using the specific example, database 122 now holds the contents of Table IV. Thus, a policy administered from office 62 has remotely changed base stations 34 that are accessible by device 58 from all access stations 34 down to access station 34$_1$.

Figure 5:
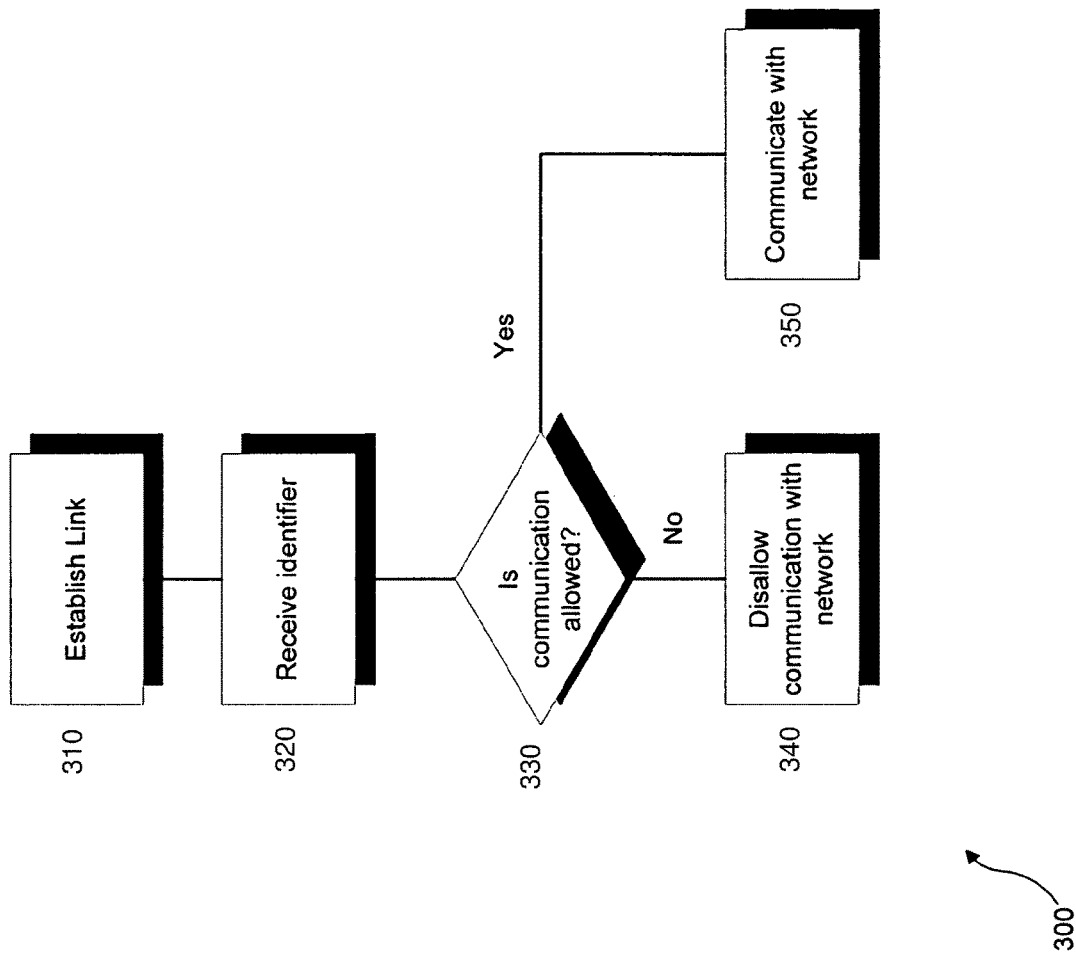
FIG. 5 is a flowchart depicting a method of establishing communication according to policy in accordance with an embodiment of the invention.

Referring now to FIG. 5, a method for placing a wireless call through network 50, according to CP database 122, is indicated generally at 300. In order to assist in the explanation of the method, it will be assumed that method 300 is operated using system 30 and that device 58, as shown in FIG. 1, is located in range 38$_1$. Furthermore, the following discussion of method 300 will lead to further understanding of system 30 and its various components. (However, it is to be understood that system 30 and/or method 300 can be varied, and need not work exactly as discussed herein in conjunction with each other, and that such variations are within the scope of the present invention.)

Referring back to FIG. 5, at step 310 a link is established. As an example of how step 310 can be performed, device 58 establishes link 42$_1$ with station 34$_1$ which is serving range 38$_1$. Moving to step 320, an identifier is received. Continuing with the example, when step 320 is performed device 58 receives the identifier associated with an access station 34. In this case, the identifier is AID$_1$ which is the identifier of access station 34$_1$.

Method 300 then advances from step 320 to step 330, at which point a determination is made as to whether communication is permissible. In this example, the office policy is examined to determine whether communications through access station 34$_1$ are permitted. To perform this step, device 58 examines the office policy regarding wireless calls associated with identifier AID$_1$ in CP database 122. In this case, the policy associated with AID$_1$ is "Allow Communication". Accordingly, step 350 is performed next and communication is established. Accordingly, in this example, device 58 places a wireless call through network 50.

Figure 6:
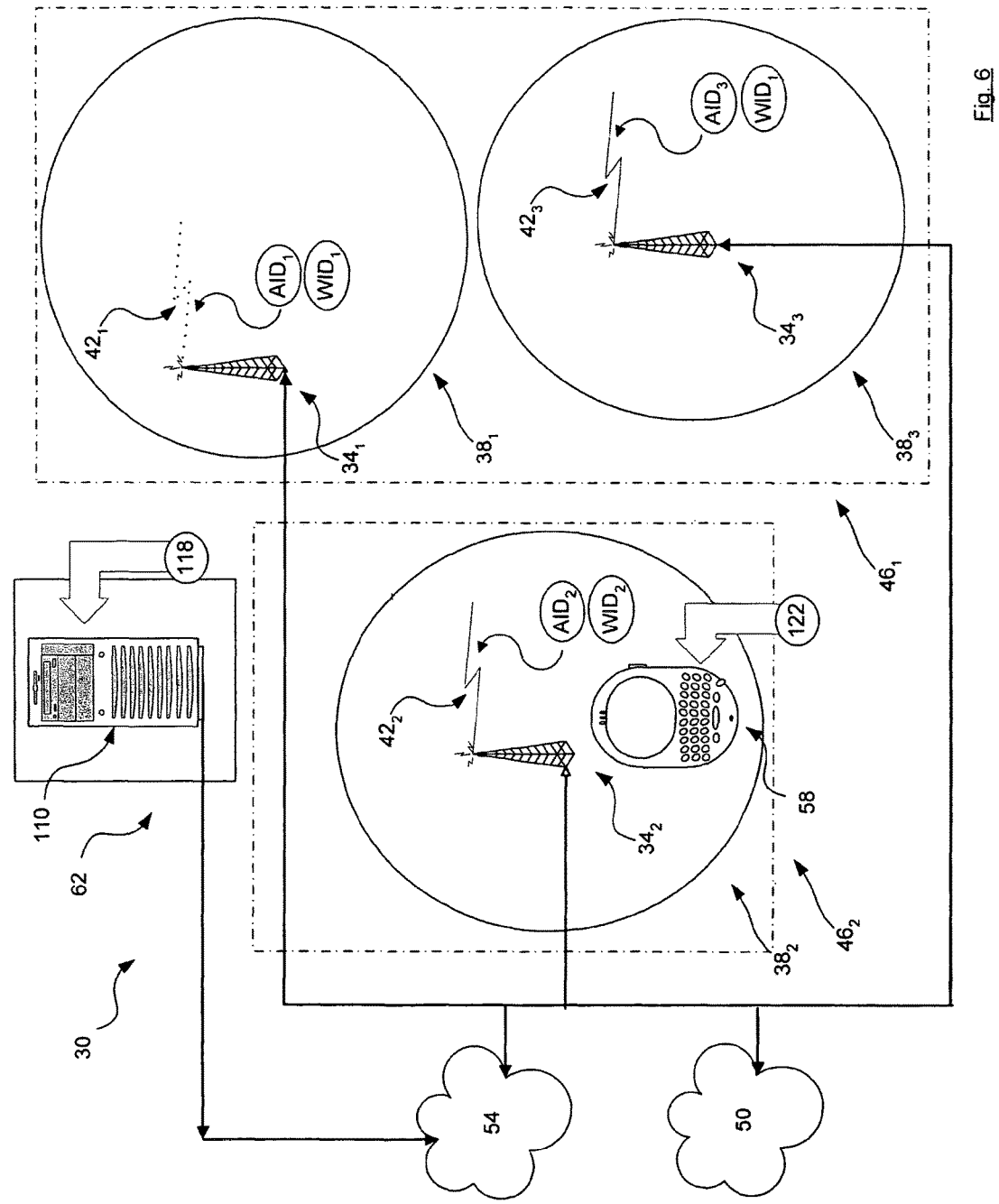
FIG. 6 is another arrangement of the system of FIG. 1.

Referring to FIG. 6, device 58 now moves to range 38$_2$, served by access station 42$_2$. In order to place a wireless call using device 58, according to CP database 122, method 300 is performed a second time.

Referring back to FIG. 5, at step 310 a link is established. As an example of how step 310 can be performed during this second performance of method 300, device 58 establishes link 42$_2$ with station 34$_2$ which is serving range 38$_2$. Moving to step 320, an identifier is received. Continuing with the example, when step 320 is performed device 58 receives the identifier associated with access station 34. In this case, the identifier is AID$_2$ which is the identifier of access station 34$_2$.

Method 300 then advances from step 320 to step 330, at which point a determination is made as to whether communication is permissible. In this example, the office policy is examined to determine whether communications through access station 34$_2$ are permitted. To perform this step, device 58 examines the office policy regarding wireless calls associated with identifier AID$_1$ in CP database 122. In this case, the policy associated with AID$_2$ is "Disallow Communication", as shown in Field 2 of Table IV. Accordingly, step 340 is performed next and communication is not permitted. Accordingly, in this example device 58 is prevented from placing a call.

Figure 7:
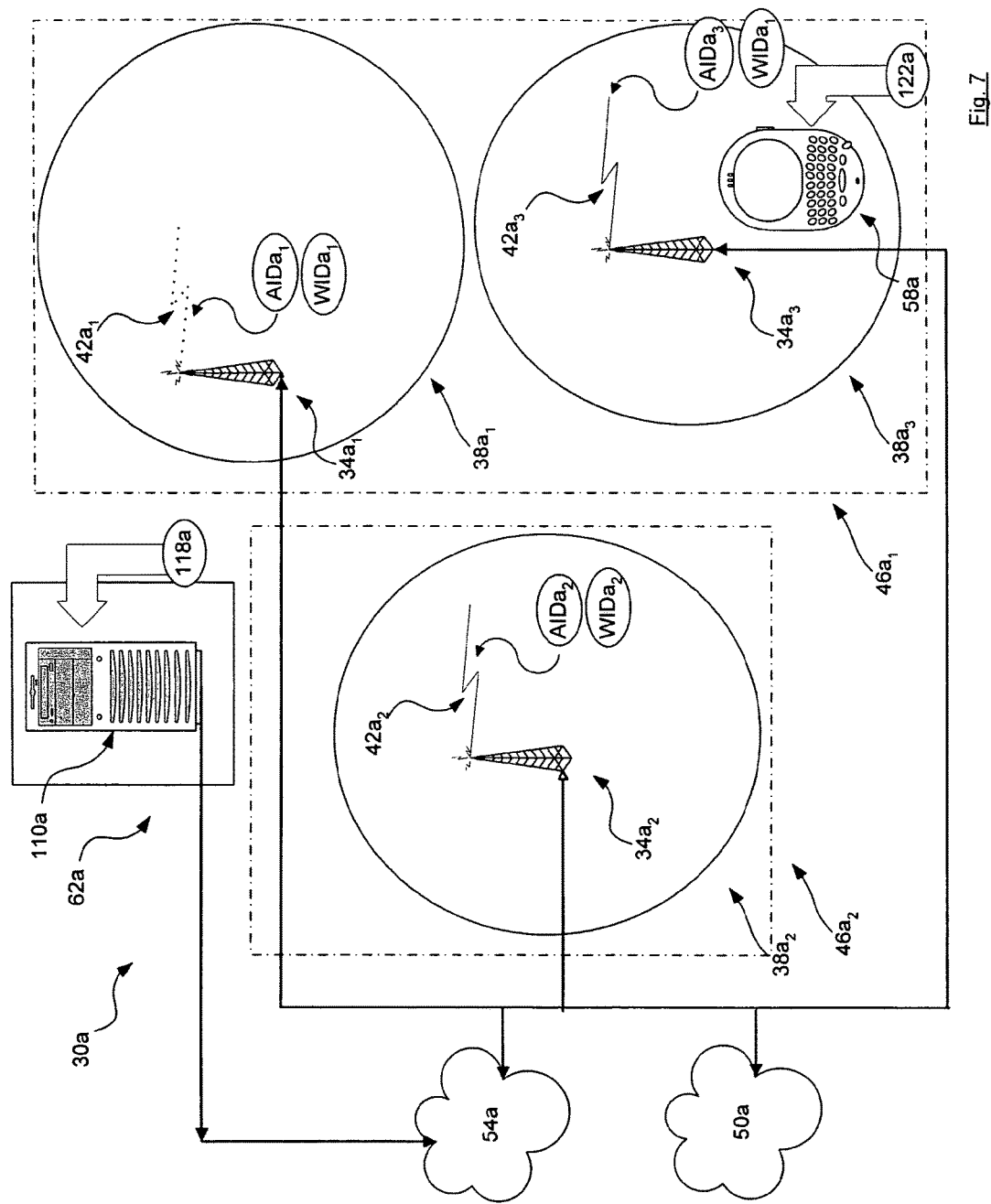
FIG. 7 is a block diagram of a system for modifying communication policy in accordance with another embodiment of the invention.

Referring now to FIG. 7, a system for secure access in accordance with another embodiment of the invention is indicated generally at 30a. System 30a is substantially the same as system 30, and like elements in system 30a bear the same reference as like elements in system 30, except followed by the suffix "a". System 30a differs from system 30 in that in system 30a different policy databases are used.

In this embodiment, office 62a desires that device 58a place wireless calls through network 50a only using wireless carrier 46a$_1$ since wireless carrier 46a$_1$ offers cheaper connections than other carriers 46a. According to this policy, office 62a would not want device 58a to connect to network 50a through access station 34a$_2$ since station 34a$_2$ is operated by wireless carrier 46a$_2$. CP database 118a reflecting this policy is shown in Table V.

TABLE V

Example record of an Updated CP Database 118a of Office 62a
Record # 1

| Field 1<br>Device<br>Identifier | Field 2<br>Wireless<br>Carrier<br>Identifier | Field 3<br>Policy |
|---|---|---|
| 555-555-5555 | WID$_1$ | Allow Communication |
|  | WID$_2$ | Disallow Communication |

Notice that Field 3 associated with WID$_2$ is set to "Disallow Communication" to reflect the new policy that device 58a should not connect to network 50a through wireless carrier 46a$_2$. Such a policy that limits communications according to carrier could be desired for a number of reasons, such as reducing or controlling roaming charges, such that a particular device 58a can only perform communications in a home region. Other criteria for setting policies that reside in device 58a which define access stations 34a that are accessible to device 58a will now occur to those of skill in the art.

By the same token, device 58a also includes a CP database 122a that includes data that corresponds with the information stored in connection policy database 118a. Contents of CP database 122a is updated by performing method 200, shown in FIG. 4 in substantially the same manner as database 122 in system 30. The updated CP database 122a is shown in Table VI.

TABLE VI

Example of an Updated CP Database 122a of Device 58a

| Field 1<br>Wireless Carrier Identifier | Field 2<br>Policy for Voice Calls |
|---|---|
| $WID_1$ | Allow Communication |
| $WID_2$ | Disallow Communication |

Referring back to FIG. 7, device 58a is in range $38a_2$, served by access station $42a_3$. In order to place a wireless call using device 58a, according to CP database 122a, method 300 is performed.

Referring back to FIG. 5, at step 310 a link is established. As an example of how step 310 can be performed, device 58a establishes link $42a_3$ with station $34a_3$ which is serving range $38a_3$. Moving to step 320, an identifier is received. Continuing with the example, when step 320 is performed device 58a receives the identifier associated with wireless carrier 46a. In this case, the identifier is $WIDa_1$ which is the identifier associated with wireless carrier $46a_1$ operating access station $34a_3$.

Method 300 then advances from step 320 to step 330, at which point a determination is made as to whether communication is permissible. In this example, the office policy is examined to determine whether communications through access stations operated by wireless carrier $46a_1$ are permitted. To perform this step, device 58a examines the office policy regarding wireless calls associated with identifier $WIDa_1$ in CP database 122a. In this case, the policy associated with $WIDa_1$ is "Allow Communication", as shown in Field 2 of Table VI. Accordingly, step 350 is performed next and communication is established. Accordingly, in this example, device 58a places a wireless call through network 50a.

Figure 8:
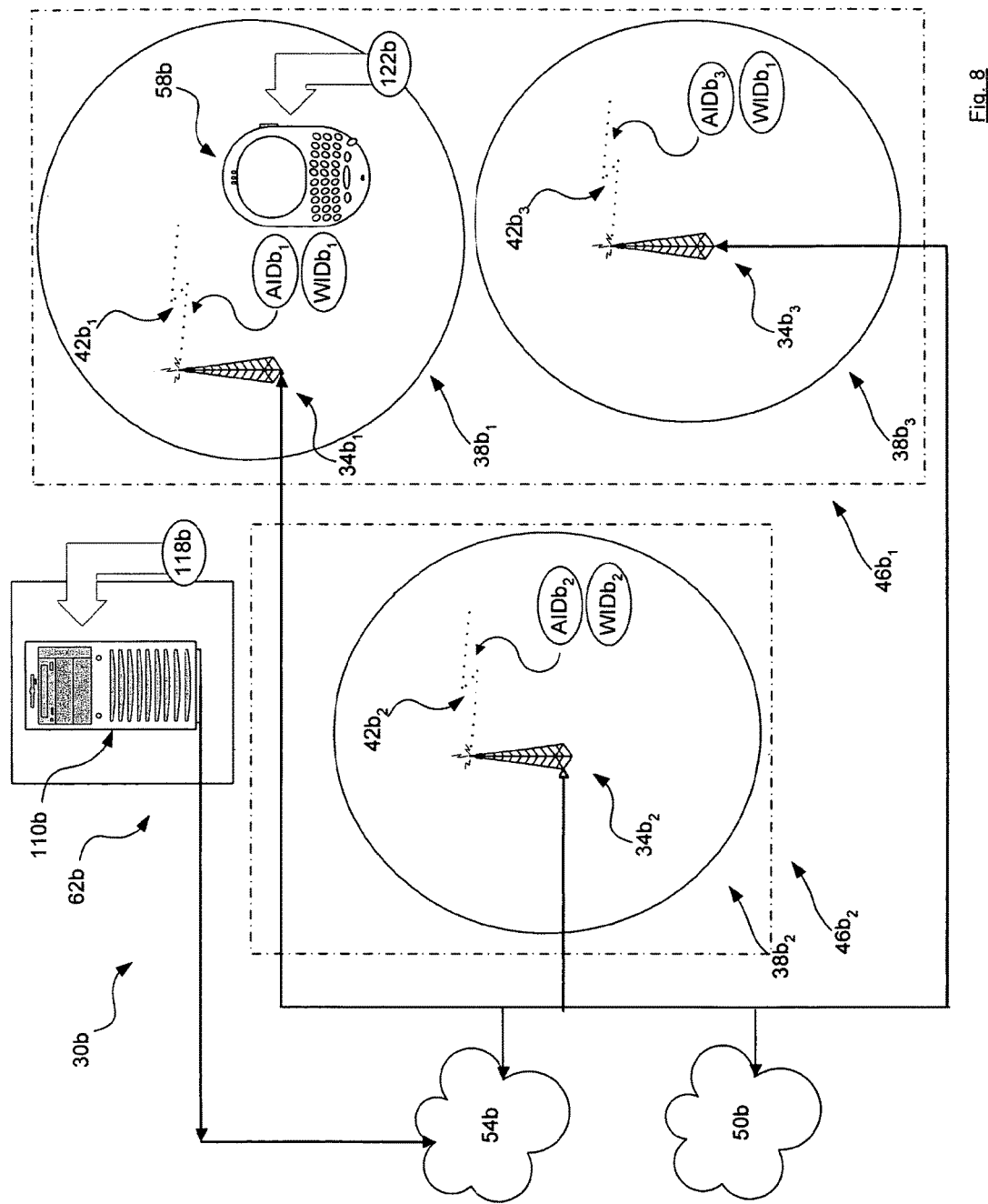
FIG. 8 is a block diagram of a system for modifying communication policy in accordance with an embodiment of the invention.

Referring now to FIG. 8, a system for secure access in accordance with another embodiment of the invention is indicated generally at 30b. System 30b is substantially the same as system 30, and like elements in system 30b bear the same reference as like elements in system 30, except followed by the suffix "b". System 30b differs from system 30 in that in system 30b all links 42 are digital and that different policy databases are used.

In system 30b office 62b employs CP database 118b which is substantially the same as CP database 118 but has additional fields used for determining which access stations 34b a device 58b can link with in order to connect to different networks when using different applications (e.g. voice calls, web browsing, and e-mail). For example, an additional field is used for determining which access stations 34b a device 58b can link to in order to connect to e-mail through the Internet (network 54b). A further field is used for determining which access stations are linkable for surfing the web through the Internet (network 54b). Table VII shows an example of database 118b of office 62b for device 58b.

TABLE VII

Example record of a Connection Policy Database 118b of Office 62b

| Field 1<br>Device Identifier | Field 2<br>Access Station Identifier | Field 3<br>Policy for Voice Calls | Field 4<br>Policy for E-mail Through The Internet | Field 5<br>Policy for Web-surfing Through The Internet |
|---|---|---|---|---|
| 555-555-5555 | $AID_1$ | Allow Communication | Allow Communication | Disallow Communication |
|  | $AID_2$ | Allow Communication | Allow Communication | Disallow Communication |
|  | $AID_3$ | Allow Communication | Disallow Communication | Allow Communication |

Table VII shows one record, labelled Record 1, which reflects information corresponding to device 58b. It should now be apparent that database 118b can include additional records for any additional devices 58b that are included in system 30b, or additional fields for additional applications available on device 58b.

Describing Table VII in greater detail, Fields 1 through 3 contain the same information as CP database 118, shown in Table I. Field 4 contains the communications policy of office 62b for each access station 34b, in this case simply the decision to either "Allow Communication", or "Disallow Communication", to be used when device 58b attempts to check e-mail through network 54b. In this case, device 58b can only check e-mail when connected to network 54b through access stations $34b_1$ and $34b_2$. Note also that device 58b is permitted to place voice calls through any of the access stations 34b.

Continuing with the description of Table VII, Field 5 contains the communications policy of office 62b for each access station 34b, in this case simply the decision to either "Allow Communication", or "Disallow Communication", to be used when device 58b attempts to surf the web through network 54b. In this case device 58b can surf the web only through access stations $34b_3$. (It should now be apparent that other communications policies (rather than "allow" or "disallow" communication) can be stored in CP databases 118b, and 122b. For example, a communication policy may limit the data bandwidth when device 58b is in range of some access stations 34b and allow limitless bandwidth when in range of others. It should also be apparent that a combination of policies can also be used.)

Device 58b also includes a CP database 122b that includes data that corresponds with the information stored in connection policy database 118b. CP database 122b is updated by performing method 200, shown in FIG. 3 in substantially the same manner as CP database 122 in system 30. The updated CP database 122 is shown in Table VIII.

TABLE VIII

Example of a CP Database 122b of Device 58b

| Field 1<br>Access<br>Station<br>Identifier | Field 2<br>Policy for<br>Voice Calls | Field 3<br>Policy for<br>E-mail<br>Through The<br>Internet | Field 4<br>Policy for<br>Web-surfing<br>Through The<br>Internet |
|---|---|---|---|
| $AID_1$ | Allow Communication | Allow Communication | Disallow Communication |
| $AID_2$ | Allow Communication | Allow Communication | Disallow Communication |
| $AID_3$ | Allow Communication | Disallow Communication | Allow Communication |

Field 1 of database 122b corresponds to Field 2 of database 118b, Field 2 of database 122b corresponds to Field 3 of database 118b, Field 3 of database 122b corresponds to Field 4 of database 118b and Field 4 of database 122b corresponds to Field 5 of database 118b.

Referring back to FIG. 8, which gives an example arrangement, device 58b is range $38b_1$, served by access station $34_1$. When device 58b attempts to access e-mail, method 300 is performed again to determine the permissibility of the e-mail access. Performance of method 300 using system 30b is substantially the same as the performance of method 300 using system 30 except that Field 3 of database 122b is used to determine the policy as opposed to using Field 2 to determine the policy for voice calls. In this example, the e-mail policy associated with access station $34b_1$ (as identified by $AIDb_1$) is to allow communications. Thus, device 58b will be able to access e-mail. When device 58b attempts to surf the web, on the other hand, performance of method 300 will disallow access to the web since the policy associated with web surfing in region $38_1$ (specified by the first row of Field 4 of Table VIII) is to disallow communication.

While only specific combinations of the various features and components of the present invention have been discussed herein, it will be apparent to those of skill in the art that subsets of the disclosed features and components and/or alternative combinations of these features and components can be utilized, as desired. For example, although GSM and AMPS are wireless communication methods contemplated, it should now be apparent that other wireless communication methods such as the Code Division Multiple Access ("CDMA") for digital connections and the Total Access Communication System ("TACS") for analog connections are all within the scope of the invention. Other methods include General Packet Radio Service ("GPRS"), and Orthogonal Frequency Division Multiplexing ("OFDM"), amongst others.

In another variation, database 122 in system 30 can be updated through a direct connection between device 58 and office server 110. It should now be apparent that this direct connection can take the form of a wired connection such as a Universal Serial Bus ("USB") connection, a cross-linked peer to peer Ethernet connection, or a wireless connection such as a Bluetooth connection, an infrared (IR) connection, or a peer to peer IEEE 801.11 (e.g. 802.11b, 802.11g or other 802.11 variants) connection. In yet another variation, database 122 could be updated through a Local Area Connection ("LAN") to which both device 58 and office server 110 are connected.

In another variation, different criteria other than location of device 58 can be used for enabling, disabling or otherwise varying the communication capabilities of device 58. For example, time can be used as a determinant of communication capabilities. Accordingly, device 58 and certain applications performing on device 58, such as e-mail, could be allowed to communicate during certain periods of time such as daytime, and certain other applications, such as voice calls, could be able to communicate during other time periods such as night time. These policies can be designed, for example, to take advantage of periods during which certain services are offered at reduced costs by wireless carriers. Thus, office 62 can set up a policy database 118 which allows voice calls only during evenings and weekends when voice calls are cheaper. As another example, policies can be set up to choose between different wireless carriers when each region is served by multiple carriers. So, for example, if a region 38 is served by 2 access stations 34, device 58 can determine which access station to use consulting the communications policy (namely during the performance of method 300). Accordingly, when there is a choice of carriers, policies could be designed to select more secure, less expensive or otherwise more desirable wireless carrier over those carriers that are less secure, more expensive or otherwise less desirable.

In yet another variation, device CP database 122 could be updated using different methodologies. For example, the transfer of CP database 118 could be made selectively, transferring the database only when a difference is found between CP database 118 and 122. It should now be apparent that a variety of different methods could be employed for determining a difference. For example, each field of database 118 can be compared to the equivalent fields in database 122 to determine whether there are any differences. Alternatively, sizes of the database files or the date of modification of these files could be compared. Moreover, the comparison can be done either by office server 110, device 58 or some other computer trusted with maintaining synchronized CP databases between the office and the roaming devices. All these methods, and other methods for determining whether a CP database should be transferred to device 58 are within the scope of this invention.

In other variations, the policy can be stored in forms other than a database such as a lookup table. Moreover, the policy can be stored at a computer other than the office server. For example, the policy can be stored on routers and other dedicated computing devices. Also, the policy could be stored on a computer or other electronic device which is operated by an entity other than the office that operates the mobile devices.

While portions of the foregoing description may individually reference systems 30, 30a, 30b and 30c, it should now be apparent that all or parts of each of these systems can be combined as appropriate or otherwise desired. Accordingly, those of skill in the art will recognize that when certain references are made to one of these systems, and/or its components, such teachings can also be applicable to other ones of those systems.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A mobile device comprising:
an interface configured to communicate between the mobile device and a plurality of access stations via a link defined in one or more IEEE 802.11 specifications in each of a plurality of geographic regions, each of the plurality of access stations having a wireless carrier identifier that identifies a wireless carrier operating the access station, and an access station identifier that uniquely identifies the access station; and,
a microcomputer connected to the interface and configured to:
maintain a first policy comprising a list of wireless carrier identifiers;
receive the wireless carrier identifier and the access station identifier associated with an access station; and
restrict the interface from communicating with the access station in accordance with the first policy in response to determining that the communication with the access station is over an insecure link.

2. The mobile device of claim 1, wherein the microcomputer is further configured to determine whether the link is insecure based on the wireless carrier.

3. The mobile device of claim 1, wherein the first policy is designed to select, from a plurality of wireless carriers, a more secure wireless carrier over a wireless carrier that is less secure in comparison.

4. The mobile device of claim 1, wherein the microcomputer is further configured to maintain a second policy, and to select a wireless carrier using a combination of the first policy and the second policy.

5. The mobile device of claim 4, wherein the microcomputer is further configured to select from the plurality of wireless carriers which are the more secure carriers as determined by the first policy, a wireless carrier based on the second policy.

6. The mobile device of claim 5, wherein the second policy is designed to prefer selection of a home network over selection of a non-home network.

7. The mobile device of claim 5, wherein the selection of the wireless carrier based on the second policy is based on the wireless carrier identifiers.

8. The mobile device of claim 7, wherein the microcomputer is further configured to maintain a third policy that selects from the plurality of wireless carriers available from the first policy and the second policy, a wireless carrier based on wireless carrier identifiers.

9. The mobile device of claim 1, wherein the interface is further configured to communicate between the mobile device and at least one access station using a plurality of different services.

10. The mobile device of claim 9, wherein the plurality of different services include one or more of voice, emails, internet browsing and text messaging.

11. A communication system comprising at least one mobile device of claim 1 and a server, wherein the server is configured to: decide the policy and transmit the policy to the at least one mobile device such that the server controls the communication.

12. A method comprising:
at a mobile device comprising: an interface configured to communicate between the mobile device and a plurality of access stations via a link defined in one or more IEEE 802.11 specifications in each of a plurality of geographic regions, each of the plurality of access station having a wireless carrier identifier that identifies a wireless carrier operating the access station, and an access station identifier that uniquely identifies the access station; and a microcomputer connected to the interface,
maintaining, using the microcomputer, a first policy comprising a list of wireless carrier identifiers;
receiving the wireless carrier identifier and the access station identifier associated with an access station; and
restricting, using the microcomputer, the interface from communicating with the access station in accordance with the first policy in response to determining that the communication with the access station is over an insecure link.

13. The method of claim 12, further comprising determining whether the link is insecure based on the wireless carrier.

14. The method of claim 12, further comprising selecting based on the first policy, from a plurality of wireless carriers, a more secure wireless carrier over a wireless carrier that is less secure in comparison.

15. The method of claim 12, further comprising maintaining a second policy, and selecting a wireless carrier using a combination of the first policy and the second policy.

16. The method of claim 12, further comprising selecting from the plurality of wireless carriers which are the more secure carriers as determined by the first policy, a wireless carrier based on the second policy.

17. The method of claim 15, wherein the second policy is designed to prefer selection of a home network over selection of a non-home network.

18. The method of claim 12, wherein the interface is further configured to communicate between the mobile device and at least one access station using a plurality of different services.

19. The method of claim 18, wherein the plurality of different services include one or more of voice, emails, internet browsing and text messaging.

20. A non-transitory computer-readable medium storing a computer program, wherein execution of the computer program is for:
at a mobile device comprising: an interface configured to communicate between the mobile device and a plurality of access stations via a link defined in one or more IEEE 802.11 specifications in each of a plurality of geographic regions, each of the plurality of access station having a wireless carrier identifier that identifies a wireless carrier operating the access station, and an access station identifier that uniquely identifies the access station; and a microcomputer connected to the interface,
maintaining, using the microcomputer, a first policy comprising a list of wireless carrier identifiers;
receiving the wireless carrier identifier and the access station identifier associated with an access station; and
restricting, using the microcomputer, the interface from communicating with the access station in accordance with the first policy in response to determining that the communication with the access station is over an insecure link.

* * * * *